Dec. 8, 1936.  H. D. HALEY  2,063,673
LUBRICATING SYSTEM
Filed Nov. 16, 1935
Fig.1.
Fig.2.
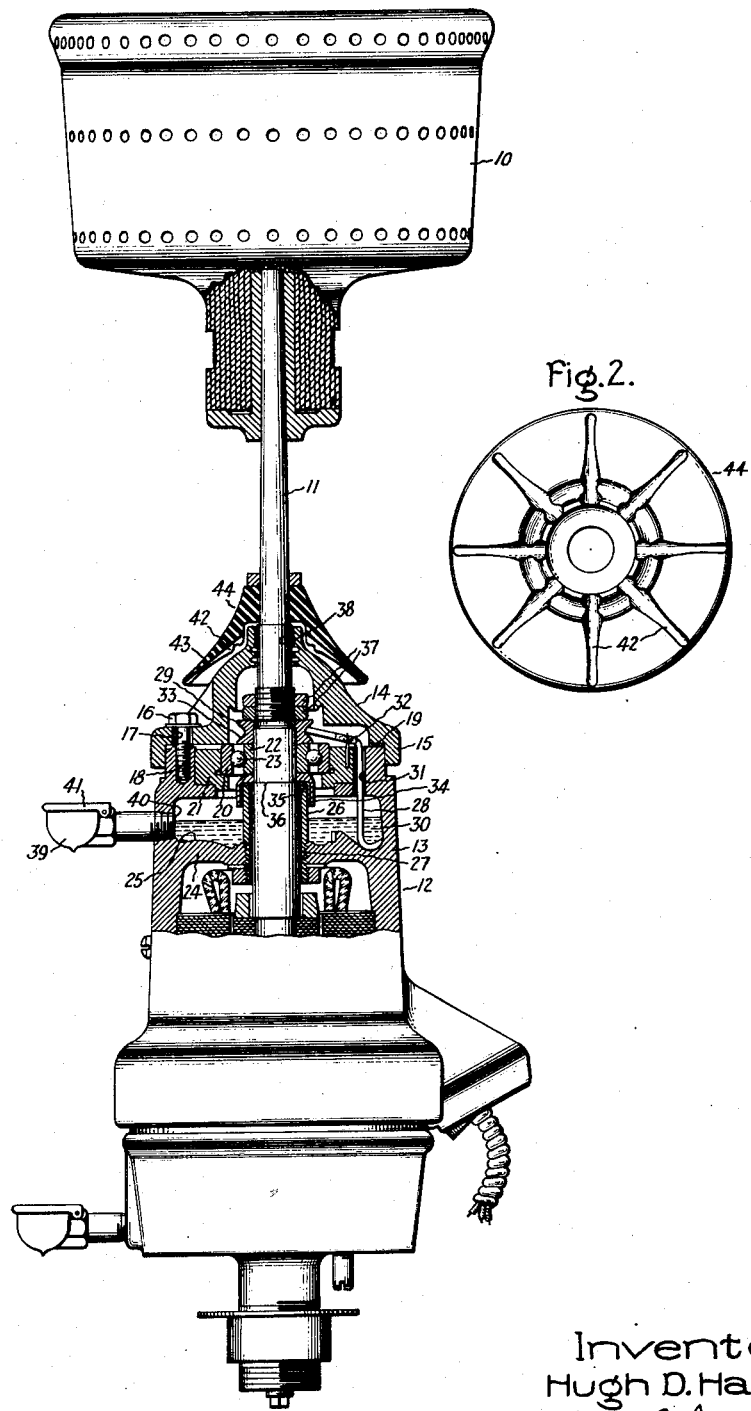
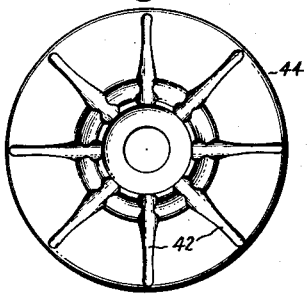
Inventor:
Hugh D. Haley,
by Harry E. Dunham
His Attorney.

Patented Dec. 8, 1936

2,063,673

UNITED STATES PATENT OFFICE 2,063,673

LUBRICATING SYSTEM

Hugh D. Haley, Lynn, Mass., assignor to General Electric Company, a corporation of New York Application November 16, 1935, Serial No. 50,220

4 Claims. (Cl. 308—187)

My invention relates to lubricating systems for shaft bearings.

Many machines, and particularly those designed for certain present day textile manufacturing operation, such as rayon spinning, include shafts driven at speeds at from 5,000 r. p. m. to 20,000 r. p. m. The bearings provided for such rotatable shafts are ordinarily of the antifriction type and the lubricating systems therefor must be designed with the greatest care in view of the extremely high speeds of rotation involved. An adequate supply of lubricant is vital not only in order to protect the contacting surfaces of the bearing, but also in order to maintain the necessary power consumption at as low a value as possible. The lubricating system for a bearing in such service should provide an ample reserve of lubricant and provision should be made for constantly supplying fresh lubricant to the bearings at a definite rate without leakage therefrom. Either a deficiency or surplus of lubricant will cause large and even dangerous friction losses in a bearing for a shaft operating at such high speeds as those indicated above. If the supply of lubricant is deficient, the contacting surfaces will become dry and, as a consequence, will come into direct contact thus damaging the bearing. On the other hand, a surplus of lubricant will cause excessive friction losses and may even cause the bearing to burn out. In some types of lubricating systems, it is necessary to provide a rotatable slinger or similar member closely adjacent the bearing which is utilized to throw a fine spray of lubricant over the bearing. Such a rotatable member, however, causes an increased pressure to be built up within the housing which surrounds the bearing and also in the reservoir from which lubricant is supplied to the bearing. This increased pressure in the lubricant reservoir frequently results in either forcing the lubricant from the reservoir out through the filling cups therefor, or in giving a false indication of the level of the lubricant in the reservoir.

It is an object of my invention to provide a lubricating system for a rotatable shaft and its bearings in which an arrangement is provided for neutralizing any excess pressure created within the bearing housing, which utilizes a minimum number of parts, and which is effective in operation.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing, in which Fig. 1 is a front elevation, partly in section, of a rayon spinning motor having a shaft and bearing therefor provided with a lubricating system embodying my invention, and Fig. 2 is an enlarged view of the bottom of the acid deflector shield shown in Fig. 1.

Referring to the drawing, I have shown in Fig. 1 a rayon spinning bucket 10 mounted on a vertical rotatable shaft 11 of an electric driving motor 12. The electric motor 12 is enclosed in a main housing 13 which includes a cap 14. The cap 14 is provided with a depending annular flange 15 which closely fits the upper portion of the main housing 13, and the cap 14 is secured in position by a cap screw 16 which passes through a hole 17 formed therein and is threaded in a tapped hole 18 formed in the top of the housing 13. A gasket 19 is provided between the upper surface of the housing 13 and the adjacent lower surface of the cap 14 in order to prevent the leakage of lubricant therebetween. The shaft 11 is supported by a lower bearing and an upper antifriction bearing of the same general construction. The upper antifriction bearing includes an outer race 20 secured in a bore formed in a collar 21 which is in turn secured in a bore formed in the upper portion of the housing 13. An inner race 22 of the antifriction bearing is secured to the shaft 11. An annular series of balls 23 are carried between the inner race 22 and the outer race 20.

A horizontal partition 24 is provided within the housing 13 and forms the bottom wall of a lubricant reservoir 25 located below the antifriction bearing described above. The inner wall of the lubricant reservoir 25 is formed by a sleeve 26 which surrounds the shaft 11 in spaced relation thereto. The lower end of the sleeve 26 is threaded in a tapped hole 27 formed in the partition 24 and surrounding the shaft 11. Lubricant is supplied from the reservoir 25 through a wick 28, through which it passes by capillary action, to a rotatable slinger or member 29 which is secured to the shaft 11. It will be noted that the lower end of the wick 28 is immersed in the lubricant 30 contained in the lubricant reservoir 25 and that the central portion thereof is located in a hole 31 formed in the housing 13. A pin 32 mounted in the housing 13 maintains the wick 28 in position. Lubricant passing upwardly through the wick 28 to the slinger 29 is thrown outwardly from the surfaces 33 of the slinger 29 in a fine spray and thus covers the surfaces of the balls 23 of the bearing. It will thus be seen that a uniform quantity of finely divided lubricant is supplied to the bearing during the operation of the motor. An inverted cup-shaped shield 34 is mounted on the shaft 11 below the bearing with its lower edges surrounding the upper portion of the sleeve 26 in spaced relation thereto. The shield 34 diverts the lubricant returning from the bearing back to the lubricant reservoir 25 and prevents the entrance of the same into the space between the sleeve 26 and the shaft 11. The shield 34 is provided with an inwardly extending flange 35 which rests on a shoulder 36 formed on the shaft 11. The inner race 22 of the bearing rests on the flange 35 and the slinger 29 in turn rests upon the upper side of the inner race 22. When the shield 34, the inner race 22, and slinger 29 are positioned on the shaft as described above they are held firmly in position by a pair of lock nuts 37, which are threaded on the shaft 11 above the slinger 29.

In the operation of the machine described above, the shaft 11 rotates at very high speeds, that is, at a speed of between 5,000 and 20,000 r. p. m. The slinger 29 and lock nuts 37 are also rotated at this speed, and I have found that when so rotating they tend to draw air into the housing through the opening 38 in the cap 14 between the portion of the cap about the opening 38 and the shaft 11, which extends closely adjacent thereto. The pressure of the air within the housing 13 and the lubricant reservoir 25 is thus raised to a value above atmospheric pressure due to the fan action of the slinger 29 and lock nuts 37. This results in an increased pressure on the lubricant 30 in the reservoir 25 and causes the same to be forced outwardly through the lubricant filling cup 39, which communicates at its inner end 40 with the lubricant reservoir 25 below the level of lubricant. Consequently, if an operator of the machine lifts the cover 41 of the lubricating filling cup 39 while the machine is running, the lubricant will either flow out of the cup, thus wasting the lubricant as well as endangering the supply thereof to the bearing, or the lubricant will at least be forced so far up into the cup as to give a false indication of the level of the lubricant in the reservoir 25. It will thus be seen that when an increased air pressure exists within the housing 13 that the supply of lubricant for the bearing cannot properly be replenished and there is in fact danger that the pressure will cause so much of the lubricant 30 to be forced out of the reservoir 25 through the cup 39 that the total supply of lubricant in the reservoir for the bearing will be depleted to a dangerously low value.

In order to overcome this difficulty, I have provided an arrangement for neutralizing the increased pressure set up within the housing 13 due to the fan action of the slinger 29 and lock nuts 37. This arrangement includes a series of radially extending recesses 42 in the lower surface of a depending skirt portion 43 of an acid deflector shield 44 which is secured to the shaft 11 above the cap 14 of the housing 13. The slots 42 in the lower surface of the acid deflector shield 44 thus form impeller vanes thereon, which upon rotation of the shield 44, have a fan action tending to draw air out of the housing 13 between the adjacent surfaces of the shaft 11 and the extended portion 38 of the housing cap 14. The slots 42 formed in the lower surface of the acid deflector shield 44 are so proportioned in number and depth that the fan action or impelling action thereof will exactly balance the impelling action of the slinger 29 and lock nuts 37 and, as a consequence, the increased pressure, which would otherwise be caused by these latter elements, is exactly balanced or neutralized. The air pressure within the housing 13 and in the lubricant reservoir 25 is thus maintained at substantially atmospheric pressure. Since an acid deflector shield is ordinarily employed in a spinning motor, it will be seen that I have provided a very simple arrangement for overcoming the difficulty of increased pressure in the bearing housing and one which requires a minimum number of parts.

The acid deflector shield 44 rotates at the same speed as the slinger 29 and lock nuts 37, so that the opposing pressures created by the acid deflector shield and by the slinger and lock nuts, respectively, are exactly equal and balanced for all speeds after having been balanced for one speed during manufacture of the machine. Consequently, there is no excess pressure on the lubricant 30 and the reservoir 25 at any speed of operation of the motor, and the level of the lubricant in the lubricant filling cup 39 always gives the operator an accurate measure of the level of the lubricant in the reservoir 25.

While I have shown a particular embodiment of my invention in connection with a rayon spinning motor having a wick type lubricating system, I do not desire my invention to be limited to the particular construction shown and described, and I intend in the appended claims to cover all modifications within the spirit and scope of my invention.

What I claim as new and desire to secure by Letters Patent of the United States is:

1. A spinning spindle for a rayon spinning bucket or the like comprising a rotatable vertical shaft, a bearing for said shaft, a housing for said bearing having a portion closely surrounding said shaft above said bearing, a rotatable member carried by said shaft within said housing tending to draw air along said shaft into said housing and to thereby increase the pressure therein upon rotation of said member, and means including a deflector shield carried by said shaft above said housing and having impeller vanes on the lower surface thereof for neutralizing the increased pressure created in said housing by said member.

2. A spinning spindle for a rayon spinning bucket or the like comprising a rotatable vertical shaft, a bearing for said shaft, a housing for said bearing having a portion closely surrounding said shaft above said bearing, a rotatable member carried by said shaft within said housing tending to draw air along said shaft into said housing and to thereby increase the pressure therein upon rotation of said member, and means including a deflector shield carried by said shaft above said housing and having a depending skirt extending over the upper portion of said housing for neutralizing the increased pressure created in said housing by said member, said depending skirt of said deflector shield having a plurality of radially extending recesses formed in the lower surface thereof.

3. A spinning spindle for a rayon spinning bucket or the like comprising a rotatable vertical shaft, a bearing for said shaft, a housing for said bearing having a portion closely surrounding said shaft above said bearing, a lubricant reservoir formed in said housing below said bearing, means for supplying lubricant from said reservoir to said bearing, a lubricant filling cup communicating with said reservoir, a rotatable member carried by said shaft within said housing tending to draw air along said shaft into said housing and to increase the pressure in said lubricant reservoir thereby forcing lubricant out of said reservoir into said lubricant filling cup upon rotation of said member, and means including a deflector shield carried by said shaft above said housing and having impeller vanes on the lower surface thereof for neutralizing the increased pressure created in said housing by said member.

4. A spinning spindle for a rayon spinning bucket or the like comprising a rotatable vertical shaft having a shoulder thereon, an antifriction bearing for said shaft having an inner race secured to said shaft above said shoulder, a housing for said bearing having a portion closely surrounding said shaft above said bearing, a lubricant reservoir formed in said housing below said bearing, means including a rotatable slinger carried by said shaft above said bearing for supplying lubricant from said reservoir to said bearing, means including a lock nut threaded on said shaft for securing said slinger and said inner race in position thereon, said lock nut and said slinger tending to draw air along said shaft and into said housing and to increase the pressure therein upon the rotation thereof, and means including a deflector shield carried by said shaft above said housing and having impeller vanes on the lower surface thereof for neutralizing the increased pressure created in said housing by said slinger and said lock nut.

HUGH D. HALEY.